Figure 1:
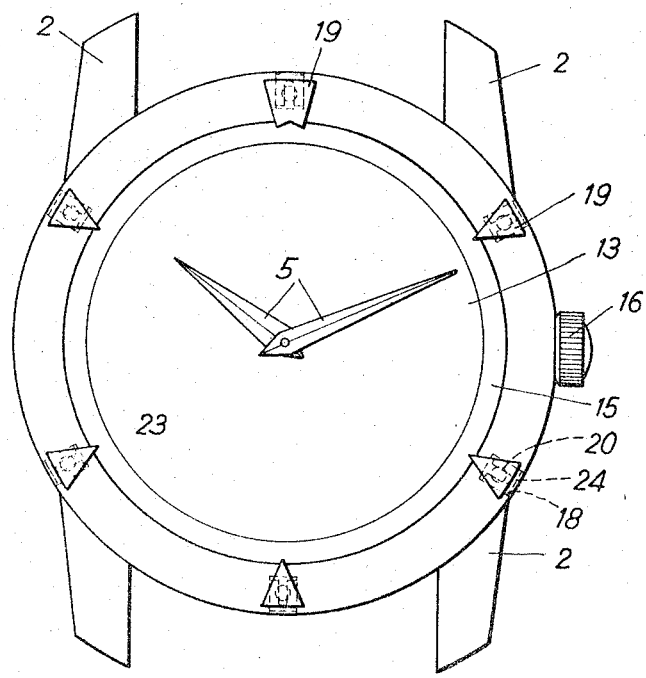

March 7, 1967  H. U. KLINGENBERG  3,307,346
WATCHCASE WITH CRYSTAL RETAINING MEANS
Filed April 22, 1965

INVENTOR.
HANS ULRICH KLINGENBERG.
BY
ATTORNEY.

United States Patent Office 3,307,346  
Patented Mar. 7, 1967

3,307,346
WATCHCASE WITH CRYSTAL
RETAINING MEANS
Hans Ulrich Klingenberg, St. Niklaus, near
Merzligen, Switzerland
Filed Apr. 22, 1965, Ser. No. 449,953
Claims priority, application Switzerland, Apr. 28, 1964,
5,526/64
3 Claims. (Cl. 58—91)

This invention relates to watchcases and in particular to watchcases comprising a caseband provided with an annular shoulder and a glass lying in said shoulder.

Fixing the glass with a watchcase raises numerous difficulties well known to those skilled in the art. Most of the known fixing methods make use of the elastical properties of the glass material being usually plastics to secure the glass to the caseband for instance by means of a snap fit. With these known methods the caseband lodging for the glass can be either slightly undercut or have a cylindrical wall.

Fixing methods of that type cannot, however, be applied advantageously when the glass is made of a very hard material such as sapphire or spinel. Even with glasses made of a reasonably yieldable material, such as for instance "Plexiglas," the fixing methods depending on the resiliency of the glass have, however, many drawbacks.

I have already suggested to make watchcases in which the glass is tightly held in place on the caseband only by providing a depression in the watchcase. With those watchcases the glass periphery usually presses a sealing gasket on the bottom face of the caseband lodging provided for the glass. That fixing method is particularly suitable with sapphire glasses and it will be observed that it can advantageously be used not only with hard glasses, but also when the remaining watchcase section is made of a very hard material having no noticeable resiliency and being very difficult to be machined. The known fixing method considered has also the advantage that the upper edge of a sapphire glass can be removed to a great extent by chamferring the glass periphery and providing facets in the chamferred glass area, since the means ensuring the glass fixation do not depend on the thickness of the glass peripheral section. Moreover, a shallow caseband shoulder for the glass is already sufficient, since the shoulder wall has only to prevent the glass from sliding in a direction perpendicular to the watchcase axis. In other words the caseband upper surface surrounding the glass can be located on a relatively low level thus giving the watch a highly appreciated flat appearance.

A watchcase in which the glass fixation is only due to a depression formed in the watchcase is, however, not absolutely safe.

It is therefore an object of this invention to provide a watchcase having all the advantages of the watchcases in which the glass fixation only depends on a depression in the watchcase, but with which the glass is prevented from falling out of its groove if air accidentally enters the watchcase.

Further and more specific objects of the invention will become apparent from the following description.

One embodiment of the watchcase according to the invention is represented diagrammatically and by way of example in the annexed drawings.

Figure 2:
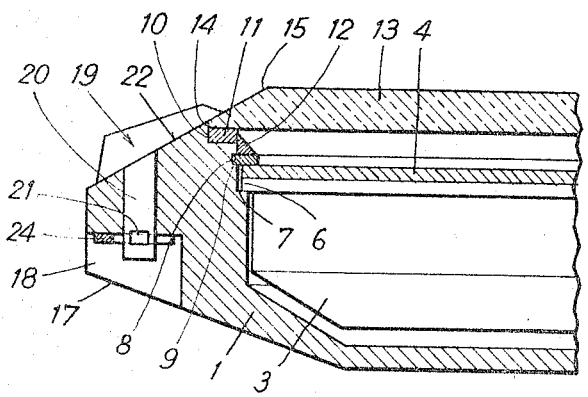

In the drawings:

FIG. 1 is a plan view of that embodiment and
FIG. 2 is a part axial section thereof.

The embodiment represented consists of a circular wrist-watch, the case of which comprises a metallic section 1 constituting both the watchcase bottom and the caseband carrying the wrist-band attaching lugs 2. A watch movement 3 carrying a dial 4 and hands 5 is located within section 1 of the watchcase. This movement is axially held in place by a peripheral rim 6 of its baseplate. Rim 6 therefore bears on an inner shoulder 7 of the caseband under the action of a resilient ring 8 inserted in an annular groove 9 provided in the inner wall of the caseband.

The movement 3 comprises a winding and hand-setting stem made in two pieces which passes through the wall of the caseband within a tube (not shown) enclosing a watertight gasket. A crown 16 is fixed at the end of the stem.

A cylindrical shoulder 10 having a flat bottom surface is provided in an upper part of the caseband and a rubber-like watertight gasket 11 having a rectangular cross-section is located in lodging 10. A ring 12 having a triangular cross-section extends within gasket 11 and lies on ring 8. The caseband carries a glass 13 which is flat and made of sapphire. This glass is relatively thick. At its periphery the glass comprises a cylindrical surface 14 and a chamferred area 15 extending above surface 14. The depth of shoulder 10 is chosen so that the circular edge extending between surface 14 and area 15 approximately stands on the same level as the uper edge of the shoulder when the glass periphery lies on gasket 11. The glass 14 and the caseband shoulder 10 are adjusted so that the glass freely enters shoulder 10 and may fall out of this lodging under the action of its own weight when the watch is turned over.

The fixation of glass 13 to the caseband 1 is obtained by a depression formed in a known manner within the watchcase. The atmospheric pressure acting then on the glass presses the same onto the gasket 11 thus preventing air from entering the watchcase.

As shown in FIG. 2 the caseband comprises a lower bevelled surface portion 17, which surrounds the bottom part of section 1. Six notches 18 regularly staggered around the watchcase axis are provided in surface portion 17. Each one of notches 18 has a bottom surface portion substantially perpendicular to the watchcase axis and two parallel side surfaces. Notches 18 serve for the fixation to section 1 of or six claw members 19 which prevent the glass 13 from falling out of the caseband shoulder 10 if air accidentally enters the watchcase. Therefore each claw member 19 comprises a body portion rigidly fixed to the caseband by means of a part 20 formed by stamping. Part 20 extends throughout an opening provided in the caseband and extending from the bevelled upper surface portion thereof to the bottom face of a notch 18. Part 20 of each claw member 19 has an end section protruding from the bottom face of notch 18 and two indentations 21 are provided in a part of this end section which extends immediately beyond the bottom surface portion of notch 18. The lower surface 22 of the body portion of claw members 19 matches with the upper truncated conical surface of the caseband.

The claw members 19 are rigidly, but removably secured to the caseband 1 by means of U-shaped latch members 24 having a rectangular cross-section. The sizes of these latch members are adapted both to the notches 18 and to the indentations 21. Firstly, the width of the two branches of the latch members is chosen so that these branches bear against the parallel side walls of notch 18 and may just enter indentations 21 so as to extend on either side of part 20, when the claw members 19 are correctly set in place. Moreover, the latch members 24 have a thickness which corresponds to the indentation portion that extends beyond the bottom face of notch 18, so that the latch members will be clamped between the bottom faces of notches 18 and the end shoulders of indentations 21.

In a modification of the embodiment represented in the drawings the claw members 19 could also be rigidly, but removably secured to the caseband by means of transverse pins extending within matching bores provided in part 20 and in the caseband wall.

In a further modification a locking nut could be screwed on the lower portion of part 20. A screw having a latching head could also be inserted in an axial tapped blind hole provided in part 20.

Each claw member 19 comprises a free end portion 23 made integral with the body portion of the claw member and extending toward the watchcase axis above shoulder 10 so that these end portions may engage the chamferred glass area 15 and retain the glass within shoulder 10 if air has accidentally entered the watchcase. Although the claw members thus extend over a glass area, they are nevertheless entirely located below the upper flat surface portion of the glass, as shown in FIG. 2.

FIG. 1 shows that the six claw members 19 are located at the place of the horal divisions indicating two, four, six, eight, ten and twelve o'clock. The five first claw members are identical, while the last one is larger. Thus, the claw members 19 not only serve to prevent the glass 14 from falling out of its lodging, but they also form part of the horal division of the watch, so that the dial 4 could be made without any indication thereon relating to the horal division.

As regards the function which the claw members 19 have to perform, it will be observed that there need not be as many claw members as shown in FIG. 1. The same function would also be performed quite satisfactory if there were only four claw members which could of course be located so as to indicate three, six, nine and twelve o'clock. In this event the winding and handsetting stem should be set off and located opposite the signs indicating either two or four o'clock.

The aesthetic appearance of the watch could be improved by resorting to claw members made of a material which differs from that of the caseband, provided that this material is strong enough to prevent the glass from falling out of its lodging. Suitable materials for the claw members are, for instance, brass, silvernickel, steel and gold.

Each claw member 19 needs not be fixed removably to the caseband. One or more of these claw members could be secured definitely to or even made integral with the caseband.

With still a further modification there could be only two claw members, one of which being definitely secured to or made integral with the caseband and the other one being removable.

The openings provided in the caseband for the claw members could also be made slightly conical instead of cylindrical and even have an oval cross-section instead of a circular one, the conicity of said openings being oriented in such a way that the claw members should be set in place by introducing the same from the bottom side of the watch. The free end portion of the claw members protruding then beyond the visible surface portion of the caseband could be bent down over that surface portion of the caseband, in order to ensure both the fixation of the claw members to the caseband and of the glass within its shoulder 10.

With still another modification the claw members could be entirely independent of the caseband and have bottom parts connected to each other by a ring which would extend under or around the watchcase bottom. The claw members would be located entirely outside the watchcase and have an upper free end portion which would be bent over the outer upper edge of the caseband so as to extend inwardly and over the caseband lodging provided for the glass.

The glass securing means disclosed above are of course principally intended for watches having a glass made of sapphire or another crystal. As shown in FIG. 2 the most important area of the glass edge is visible when the watch is observed in a direction substantially perpendicular to the watchcase axis. It can therefore be advisable to cut facets in the chamferred area 15 of the glass. In that way, the watch will give the impression that the sapphire glass constitutes a gem set on a support by the claw members.

The disclosed glass securing device has, moreover, the important advantage that it does not require delicate machining operations to be carried out on the metallic section of the watchcase, so that it can well be used with a sapphire glass mounted on a watchcase section made of a material which has no noticeable resiliency, such as for instance a very hard crystalline material.

With wrist-watches the glass securing device of the watchcase according to the invention has still a further advantage. Two claw members can be provided either so as to constitute the horal signs indicating six and twelve o'clock or opposite these signs and simultaneously serve to attach the wrist-band to the watchcase. For this purpose each one of the two claw members in question would be made integral with a block extending along a portion of the outer wall of the caseband, said portion being comprised in the space which appears in FIG. 1 as enclosed by the pair of lugs 2 situated on one side of the watchcase and serving as means to attach one end of the wrist-band to the watchcase. These two blocks would be rigidly anchored to the watchcase by the claw member parts as 20 extending within the caseband openings and could easily be provided with means for securing thereto, either definitely or removably, the two corresponding ends of the wrist-band or endpieces provided at these ends of the wrist-band, as well known by those skilled in the art. In this event the section 1 of the watchcase would of course be made without outer projections such as lugs 2 of FIG. 1, thus substantially simplifying the manufacture of piece 1 in particular when this piece is made of a hard crystalline material.

Although different modifications of the embodiment represented in the drawings have already been evoked hereabove, still further modifications will appear obvious to those skilled in the art within the scope of the appended claims.

I claim:
1. A watchcase comprising, in combination, a caseband provided with an annular shoulder, a glass lying within said annular shoulder, a claw member having a body portion and a free end portion projecting above both said annular shoulder; and the glass thus preventing the latter from falling out of said shoulder, said caseband being provided with an opening wholly radially outwardly of said glass parallel to the axis thereof, the body portion of said claw member comprising a part extending within said opening of said caseband, and a removable latch member for securing said part of said body portion of said claw member in said opening of said caseband.

2. A watchcase according to claim 1, said caseband having an upper and a lower surface portion and a slot provided in said lower surface portion, said opening provided in the caseband extending from said upper surface portion to the bottom face of said slot, said part of the body portion of the claw member extending throughout said opening of the caseband and having an end section protruding from the bottom face of said slot, an indentation being provided in said end section in a part thereof extending immediately beyond the bottom face of said slot, said latch member having a U-shape and engaging said indentation and lying against the bottom face of said slot.

3. A watchcase according to claim 1, said glass having a substantially flat top surface and a truncated conical peripheral surface portion extending beyond the inner periphery of said caseband, the free end portion of said claw member coming into engagement with said glass wholly within said truncated conical peripheral surface portion of the glass to prevent the same from falling out of said caseband shoulder.

References Cited by the Examiner

UNITED STATES PATENTS 1,718,228   6/1929   Gleason _____ 58—91

FOREIGN PATENTS 221,352   8/1942   Switzerland.
336,017   3/1959   Switzerland.

RICHARD B. WILKINSON, *Primary Examiner.*
GERALD F. BAKER, *Assistant Examiner.*